(12) United States Patent
Ma et al.

(10) Patent No.: US 8,103,090 B2
(45) Date of Patent: Jan. 24, 2012

(54) BEHAVIOR AND PATTERN ANALYSIS USING MULTIPLE CATEGORY LEARNING

(75) Inventors: Yunqian Ma, Roseville, MN (US); Isaac Cohen, Minnetonka, MN (US)

(73) Assignee: Honeywell International Inc., Morristown, NJ (US)

( * ) Notice: Subject to any disclaimer, the term of this patent is extended or adjusted under 35 U.S.C. 154(b) by 925 days.

(21) Appl. No.: 11/625,649

(22) Filed: Jan. 22, 2007

(65) Prior Publication Data

US 2008/0175482 A1 Jul. 24, 2008

(51) Int. Cl.
*G06K 9/00* (2006.01)
*G06K 9/62* (2006.01)
*G06K 9/46* (2006.01)
*H04N 7/18* (2006.01)
*G06B 21/00* (2006.01)
*H04N 5/225* (2006.01)

(52) U.S. Cl. ........ 382/155; 382/103; 382/190; 348/155; 348/169; 340/540

(58) Field of Classification Search .................. 382/190, 382/103, 155; 348/155, 169; 340/540
See application file for complete search history.

(56) References Cited

U.S. PATENT DOCUMENTS

| | | | | |
|---|---|---|---|---|
| 5,067,162 A * | 11/1991 | Driscoll et al. | | 382/126 |
| 6,137,909 A * | 10/2000 | Greineder et al. | | 382/190 |
| 6,741,756 B1 * | 5/2004 | Toyama et al. | | 382/291 |
| 6,879,709 B2 * | 4/2005 | Tian et al. | | 382/118 |
| 7,215,721 B2 * | 5/2007 | Hietala et al. | | 375/317 |
| 7,333,637 B2 * | 2/2008 | Walfridsson | | 382/124 |
| 7,643,655 B2 * | 1/2010 | Liang et al. | | 382/110 |
| 2003/0058339 A1 * | 3/2003 | Trajkovic et al. | | 348/155 |
| 2003/0058340 A1 * | 3/2003 | Lin et al. | | 348/159 |
| 2003/0156756 A1 * | 8/2003 | Gokturk et al. | | 382/190 |
| 2003/0161504 A1 * | 8/2003 | Inoue | | 382/115 |
| 2003/0185436 A1 * | 10/2003 | Smith | | 382/159 |
| 2006/0187305 A1 * | 8/2006 | Trivedi et al. | | 348/169 |
| 2007/0104382 A1 * | 5/2007 | Jasinschi | | 382/254 |
| 2010/0278391 A1 * | 11/2010 | Hsu et al. | | 382/106 |

OTHER PUBLICATIONS

Huang, "Real-Time Face Detection in Color VIdeo",2004,IEEE,pp. 1-8.*
Efros, Alexei, "Recognizing Action at a Distance" Oct. 2003, IEEE, all pages.*
Ferencz, Andras, et al., "Learning Hyper-Features for Visual Identification", *Division of Computer Science*, University of California, Berkeley, Berkeley, CA 94720,8.

* cited by examiner

*Primary Examiner* — Kathleen Y Dulaney
(74) *Attorney, Agent, or Firm* — Schwegman, Lundberg & Woessner P.A.

(57) ABSTRACT

A video processing system is configured to receive training video samples from a plurality of video sensing devices. The training video samples are sets of pair video samples. These pair video samples can include both substantially similar subject matter and different subject matter. In the first step, there is a patch pool sampled from videos, and the system select patches with more saliency. The saliency is represented by the conditional probability density function of the similar subject and the conditional probability of the different subject. During the testing phase, the system applies the selected patches from the training phase, and returns the matched subjects.

20 Claims, 5 Drawing Sheets

SPATIAL FEATURES
- 406 — Dv ——— DIRECTIONAL FEATURES, VERTICAL
- 408 — Dh ——— DIRECTIONAL FEATURES, HORIZONTAL
- 410 — Df ——— DIRECTIONAL FEATURES, FORWARD DIAGONAL ("/"),
- 412 — Db ——— DIRECTIONAL FEATURES, BACKWARD DIAGONAL ("\")
- 414 — De ——— DIRECTIONAL FEATURES, MEAN ENERGY
- 416 — Im ——— INTENSITY FEATURES, MEDIAN
- 418 — Iv ——— INTENSITY FEATURES, VARIANCE
- 420 — In ——— INTENSITY FEATURES, MIN
- 422 — Ix ——— INTENSITY FEATURES, MAX
- 428 — Dd ——— DIAGONAL ENERGY = MAX OF Df AND Db
- 430 — Hv ——— HORIZONTAL VS. VERTICAL
- 432 — Hd ——— HORIZONTAL VS. DIAGONAL
- 434 — Vd ——— VERTICAL VS. DIAGONAL
- 436 — Ho ——— HORIZONTAL VS. THE OTHERS
- 438 — Ax ——— ABSOLUTE VALUE OF POSITION x
- 440 — Ay ——— ABSOLUTE VALUE OF POSITION y

TEMPORAL FEATURES
- dI/dt ——— OPTICAL FLOW COMPONENT, INTENSITY CHANGE WITH TIME

BEHAVIOR AND PATTERN ANALYSIS USING MULTIPLE CATEGORY LEARNING

TECHNICAL FIELD

Various embodiments relate to behavior and pattern analysis, and in an embodiment, but not by way of limitation, a system and method that uses multiple category learning in a video processing system.

BACKGROUND

A video system may be configured to identify a behavior or a pattern in video data. The video system may treat the identification of the behavior or pattern as a learning problem. This aspect of the video system, which may be referred to as a learner, can be provided with image pairs and then informed whether the image sequences and/or one or more patterns in the images are matching or not. The system can then determine which image patches (local descriptors) are most consistent for matching images and which patches (local descriptors) are most discriminative for non-matching images, as well as recognizing patterns of activities of interest. The activities of interest are atomic/short duration activity, such as walking, jumping, falling, entering, exiting, and such.

SUMMARY

A video processing system is configured to receive training video samples from a plurality of video sensing devices. The training video samples are sets of pair video samples. These pair video samples can include both substantially similar subject matter and different subject matter. In the first step, there is a patch pool sampled from videos, and the system selects patches with more saliency. The saliency is represented by the conditional probability density function for the similar subject and the conditional probability of the different subject. During the testing phase, the system applies the selected patches from the training phase, and returns the matched subjects.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include digital/analog signal processing systems, software, data processing hardware, data processing system-implemented methods, and various processing operations, further described herein.

A number of figures show block diagrams of systems and apparatus of embodiments of the invention. A number of figures show flow diagrams illustrating systems and apparatus for such embodiments. The operations of the flow diagrams will be described with references to the systems/apparatuses shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

Figure 1:
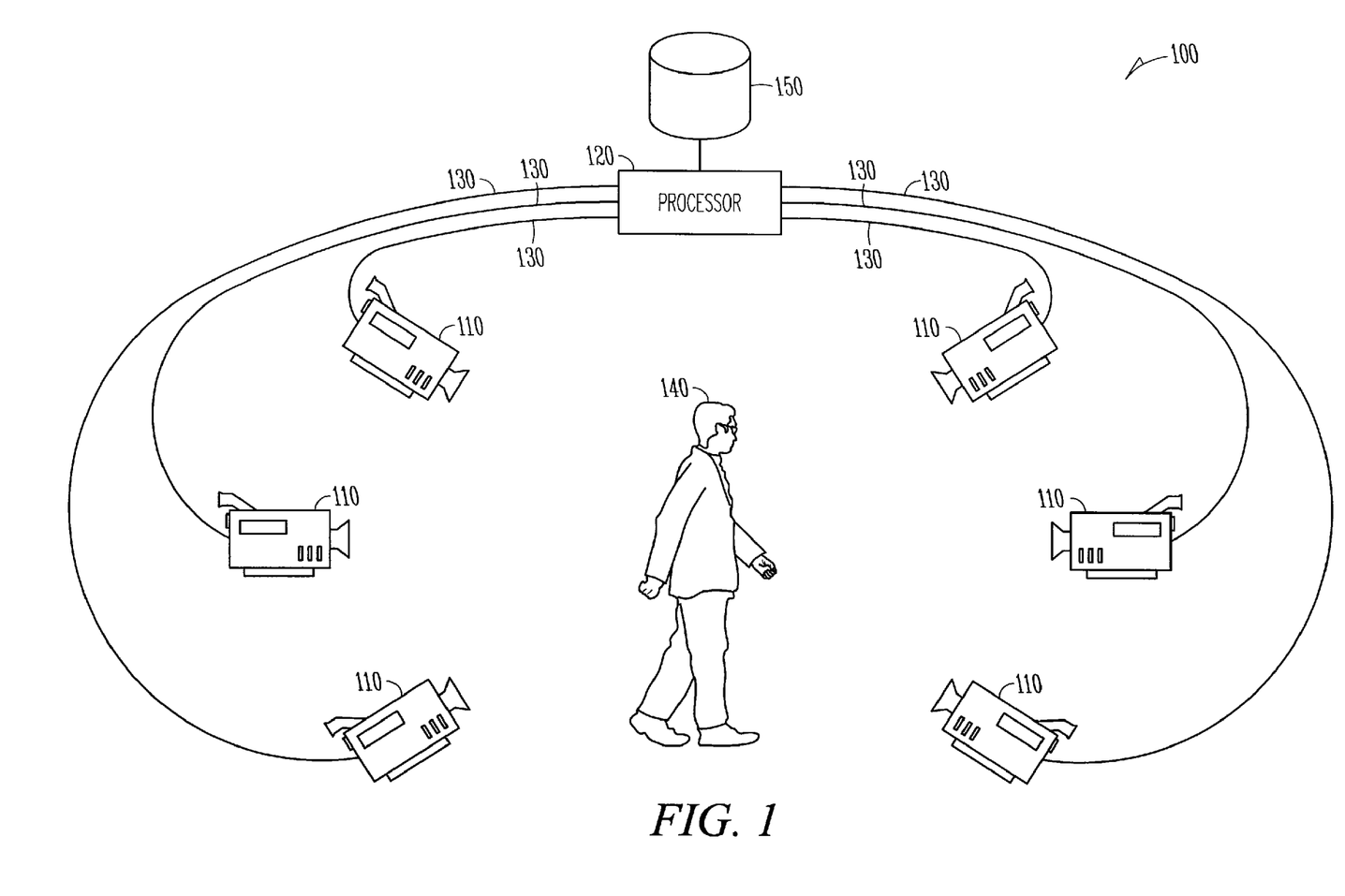
FIG. 1 illustrates an example embodiment of a video system that may be used for behavior and pattern analysis.

FIG. 1 illustrates a video processing system 100. The system 100 includes a plurality of video sensing devices 110 and a processor 120. The video sensing devices 110 are connected to the processor 120 via links 130. The links 130 can be wired or wireless links. The processor is connected to a memory or database 150. It is noted that the video sensing devices 110 need not be placed in the same plane, but rather may be placed in a three-dimensional fashion around a field of view. The video sensing devices may capture an action or behavior of a person 140 (or other animate or inanimate object) within the field of view of the video sensing devices. In an embodiment, the system 100, with its plurality of video sensing devices 110, may be used to analyze behaviors and patterns within the field of view of the video sensing devices. To do so, the system 100 is first trained to recognize a particular behavior or pattern using its plurality of video sensing devices, and then during the testing phase the system 100 is used to detect that behavior or pattern in other samples of video data. In another embodiment, the video data consists of a single frame of video data from each of the plurality of video samples, and the system 100 is trained to recognize objects (rather than behaviors) in the video data.

Figure 2:
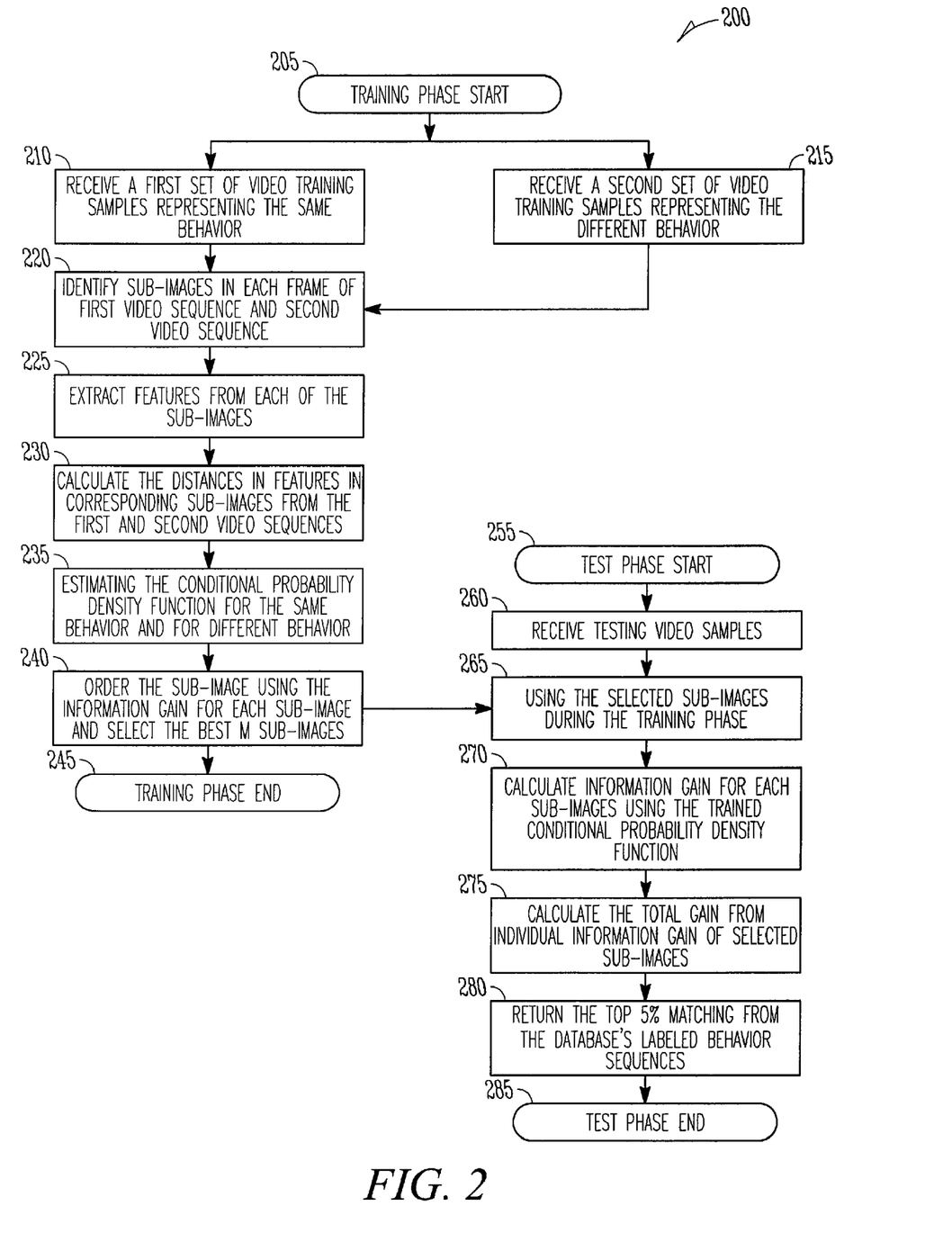
FIG. 2 illustrates an example embodiment of a process to analyze behaviors and patterns in video data.

FIG. 2 illustrates an embodiment of a behavior and pattern analysis system 200. The system 200 includes a training phase 205 and a test phase 255. In the training phase, a first set of video training samples representing the same behavior are received at 210, and a second set of video training samples representing a different behavior are received at 215. At 220, sub-images are identified in each frame of the first video sequence and the second video sequence. At 225, features are extracted from each of the sub-images. At 230, the distances between features of in corresponding sub-images from the first and second video sequences are calculated. At 235, a conditional probability density function for the same behavior and the different behavior are estimated. At 240, the sub-images are ordered using the information gain for each sub-image, and the best sub-images are selected. The training phase ends at 245.

In the test phase 255, testing video samples are received at 260. At 265, the sub-images that were selected at operation 240 in the training phase 205 are used in the testing phase 255. At 270, the information gain is calculated for each sub-image using the trained conditional probability density function. At 275, the total gain is calculated from the individual information gain of the selected sub-images. At 280, the top 5% are returned that match the behavior sequences from the training phase. The testing phase ends at 285.

A purpose of the process 200 in FIG. 2 is to train the system to be able to recognize in video data a particular behavior or pattern. More specifically, at 210 and 215, the system 100 receives a first set of training video samples. This first set of training video samples includes a plurality of different video sequences, portraying one or more behaviors or patterns. For example, the system may be trained to recognize only a single behavior, such as a person walking. Alternatively, the system 100 may be trained to detect and differentiate several behaviors such as walking, running, jumping, and falling. When the system 100 is trained to detect several behaviors or patterns, the first set of training video samples may include a number of separate video sequences of a person walking, another number of separate video sequences of a person running, another number of separate video sequences of a person jumping, and another number of separate video sequences of a person falling. A single person may be used as the subject in the training video samples, or a plurality of different persons may be used as the subjects in the training video samples.

The first set of training samples includes training video samples which include a first sequence of video images and a second sequence of video images recorded by each of the video sensing devices 110. The subject matter of the first sequence of video images and the second sequence of video images includes the same, or a substantially similar, behavior or pattern. For example, the first sequence of video images may portray a person running through the field of view. The second sequence of video images may portray either that same person or a different person running through that same field of view or another field of view. The manner in which the persons run through the field of view should be similar for both the first and second sequences of video data—for example, from the same starting point in the field of view to the same finishing point in the field of view. The subject matter of the first sequence of video images and the second sequence of video images also includes a different behavior or pattern, such as the first sequence of video images including a person who is running and the second sequence of video images including a person who is jumping. Therefore, during the training phase, there are two types of data—one type of data of a similar activity or pattern, and another type of data of a different activity or pattern.

Sub-images or patches are subjected to a behavior analysis, because sub-images or patches correspond to local descriptors, which have two advantages over a global descriptor (e.g., whole image analysis). One advantage is that local descriptors can allow for modeling local changes in behavior. The second advantage is that the local descriptor is relatively robust to change of body pose or change of viewing angle (i.e. perspective variations due to variation of the relative position and orientation of person and the camera). During the training phase, given the training data, there are three functions—(1) select sub-images (or patches) from the whole image sequence, (2) extract features from these sub-images, and (3) learn models using these features. These three functions are considered together. The strategy is to first provide a sub-images set, which is an exhaustive set of observations, and then select sub-images from the image set based on the saliency or the information contained in each sub-image.

Figure 3:
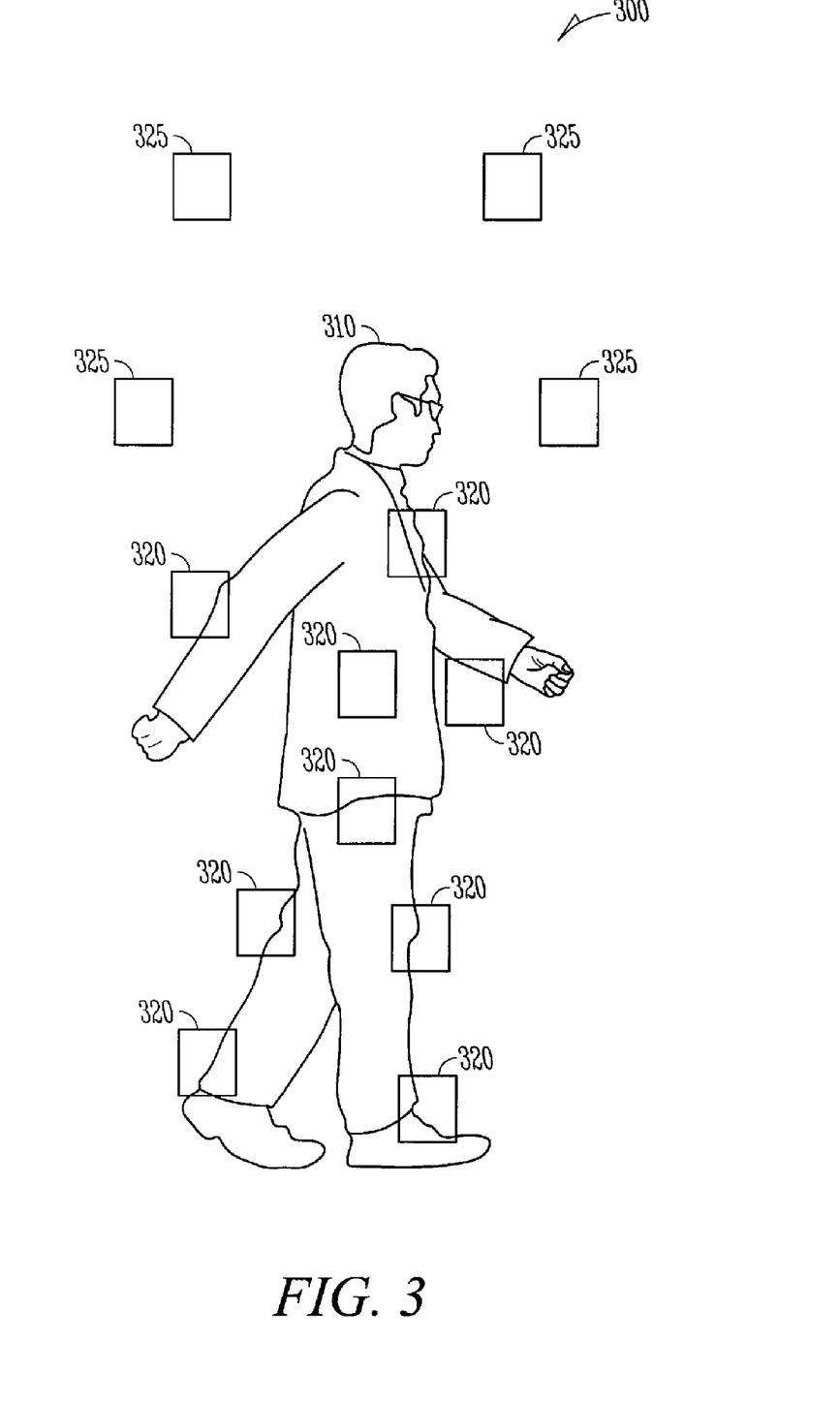
FIG. 3 illustrates an example embodiment of the placement of points of interest in video data.

A large set of sub-images or patches are sampled in each frame of the first video sequence and the second video sequence. FIG. 3 illustrates an example of the location of such sub-images in a video frame 300. Specifically, FIG. 3 illustrates an outline of a person 310 walking in the image, and the outline of several sub-images 320 and 325 in the frame. The considered sub-patches are not necessarily along the silhouette of the person: they can correspond to the most salient features in the image or the image sequence considered, or uniformly sampled in the image. In an embodiment, some of the sub-images in the first video sequence have a corresponding sub-image in the second video sequence. As will be disclosed in more detail below, a comparison is made between sub-images to identify matching or corresponding sub-images and to train the system and to identify behaviors and patterns of activity in a trained system. The placement of the sub-images 320 and 325 in the field of view may be done in several ways. The sub-images 320 and 325 are just some examples of the sub-image pools. The generation of sub-image pools may take place in many ways. The placement of the sub-images may be random (i.e. uniformly sampled, or motion driven sampling) throughout the field of view. The sub-images may be evenly spaced throughout the field of view. The sub-images may be positioned predominantly around the center of the field of view. The sub-images may be placed in the field of view based on a foreground-background analysis of the field of view (i.e., motion-driven sampling). Other ways of positioning the sub-images in the field of view also exist. As an example, if the system is being trained to recognize the behavior of a person walking through the field of view, the sub-images may be placed at a point in the field of view where the person's legs will be. Other sub-images may be placed in the field of view where the upper body will most likely be—to capture the swinging of the arms in a normal walking motion. By contrast, sub-images positioned in FIG. 3 such as sub-images 325 will in all likelihood not capture much information regarding a person walking through a scene. Whichever method is used to initially position the sub-images in a frame or field of view, the sub-images that provide the best information (saliency) will be identified, and those sub-images will be selected during the training phase and will be used in the testing phase of the system. The amount of information provided by any particular sub-image is referred to as the information gain of that sub-image, which will be explained more fully below.

Referring back to FIG. 2, at 225, features are extracted from each of the sub-images in each frame of each of the first and second video sequences for each of the video sensing devices. The features for behavior sub-images (spatial temporal patches, e.g. 25*25*12, where the 25*25 is image dimensions for one frame, 12 means 12 frames) are similar to the features for pattern sub-images (spatial patches, e.g. 25*25 for image dimension for one frame). As many features as desired can be extracted. The features for activity recognition involve spatial and temporal features. The temporal features can be dI/dt (changing of intensity), optical flow components, etc. Since the temporal features are dependant on the frame rate at which the learning sequence was acquired, a time normalization step is required (e.g., time warping) prior to comparing learned and test features.

Figure 4:
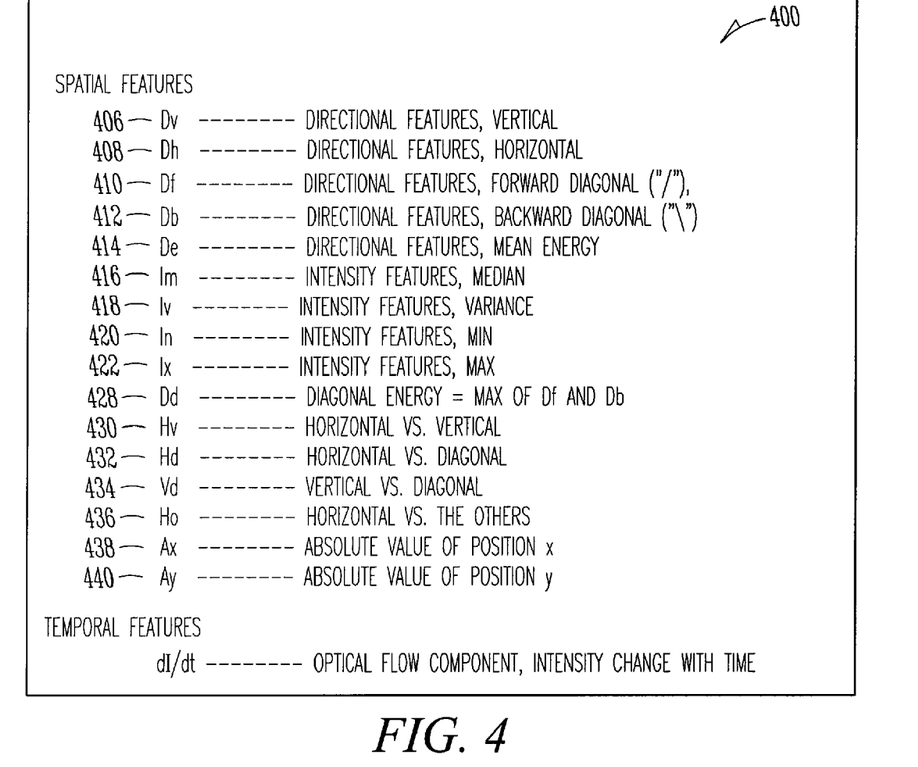
FIG. 4 is a table illustrating a list of features in video data.

These features include information relating to features such as positional information, directional information, intensity information, temporal information and derived information. FIG. 4 is a table illustrating an example set of features 400 that may be extracted from the sub-images. Features 406, 408, 410, 412, and 414 are referred to as directional features. For example, feature 410, the forward diagonal feature, refers to the size of the sub-image (which is a function of the orientation of the sub-image 320) in the forward diagonal direction. Feature 414 is the mean energy directional feature. Features 416, 418, 420, and 422 refer to intensity features of the image frame. For example, the minimum intensity feature 420 and the maximum intensity feature 422 record the minimum and maximum (pixel) intensities in a sub-image respectively. The features 416 and 418 record the median and variance of the intensity features for a sub-image. The remaining features, 428, 430, 432, 434, 436, 438, and 440, are derived features. That is, these features are derived or calculated in some manner from the features extracted from a sub-image. For example, the feature 428 is the maximum diagonal energy, that is, the maximum of the forward diagonal 410 and the backward diagonal 412. The features 430, 432, 434, and 436 are ratios of the horizontal, vertical, diagonal, and other dimensions of the sub-image. The features 438 and 440 are absolute position values (x and y respectively) within a sub-image.

After all of the features are extracted from a sub-image, the distance (differences) in the corresponding features in corresponding sub-images for the first and second video sequences are calculated at 230. The distance is the dissimilarity between features. The distance can be normalized to a range [0,1], then the distance is 1-similarity as follows $$d(x,y)=1-s(x,y) \quad (1)$$

where $d(x,y)$ is the distance between two feature vectors, $s(x,y)$ is similarity between features. The calculation of similarity $s(x,y)$ depends on the features. Generally, there are two types: if the features are heterogeneous features, $$s(x, y) = \sum_{i=1}^{n} w_i \cdot s(x_i, y_i) \quad (2)$$

Where $s(x_i, y_i)$ is the similarity between the ith feature. If the features are the all continuous variables features, then the similarity can be calculated vector based, for example $$s(x,y)=\text{correlation}(x,y) \quad (3)$$

At 235, the distances between all the features in corresponding sub-images (for a particular video sensor) are calculated. For distances between the same behavior or pattern, they are represented by "x" in FIG. 5, while for distances between the different behavior or pattern, they are represented by '•' in FIG. 5. Next we use these to calculate the conditional probability density function for the same behavior/pattern and the conditional probability density function for the different behavior/pattern. That is for sub-image/patch j, next we calculated $$P(D_j=d_j|\text{same\_activity, pattern}) \quad (3)$$

$$P(D_j=d_j|\text{different\_activity, pattern}) \quad (4)$$

Figure 5:
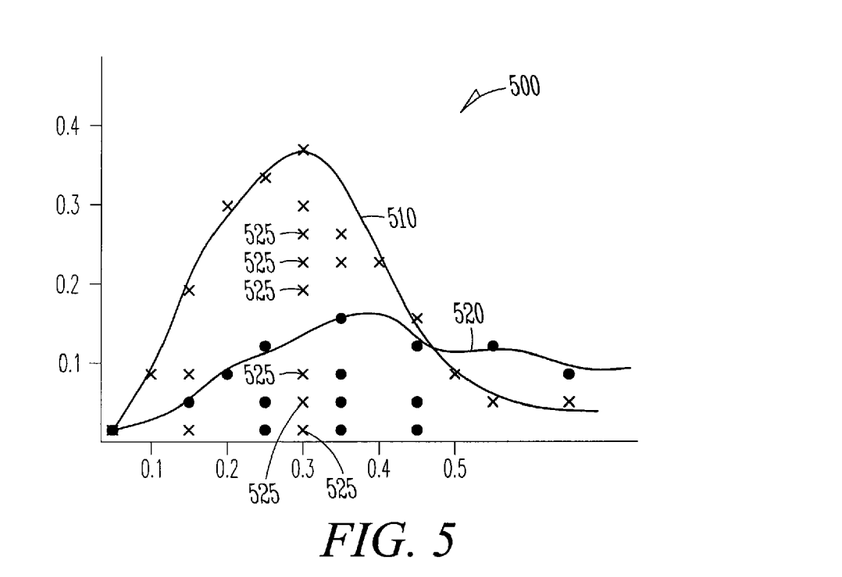
FIG. 5 is an example graph of probability density functions.

This is done for each particular corresponding pair of sub-images in the first and second video sequences. Then, a probability density function is generated for each set of sub-images from the first and second video sequences. Specifically, for a particular pair of sub-images, all of the calculated distances from each frame of the first and second video sequences are plotted on a probability density function. An example of such a probability density function 500 is illustrated in FIG. 5. Each point (represented by "x's") plotted on the abscissa represents a summation of the squared differences for a corresponding pair of sub-images in a particular frame of the first and second video sequences. For example, in FIG. 5, in six of the video frames of a video sequence, the feature differences 525 summed to approximately 0.3 (on the abscissa). And, when plotted in a histogram-like manner, the points 525 indicate a probability on the ordinate of approximately 0.35. By plotting each sum for each of the frames in a first and second video sequence pair in this manner, a probability distribution function is generated.

In the above, we assume we have the patch matching, that is, we know the corresponding patches for images. One patch matching method is as follows. Among a pair of images, one image is uniformly sampled by patches. In the other image, each patch is matched to the best point within a neighborhood by maximizing the appearance similarity between the patches. Many variations of this method exist such as local searches for best match, etc.

In an example, the difference between each of the twenty features in FIG. 4 are determined between two corresponding sub-images in each frame of the first and second video sequences. After all the distances for a particular pair of corresponding sub-images is plotted (for all frames in the first and second video sequences), a function 510 is generated using density estimation methods. There are two types of density estimation methods. One is non-parametric methods, e.g. histogram-like methods, the other method is parametric methods, which assume the estimated probability density function follows some distribution, e.g., we can assume gamma distribution and estimated parameters in gamma distribution for forming 510.

For each corresponding pair of sub-images in the set of frames of the first and second video sequences, the calculated sums of the feature differences are plotted on an abscissa (indicated by the solid dots on FIG. 5), thereby generating the second probability density function 520, the second probability density function representing two different behaviors or patterns.

Figure 6A:
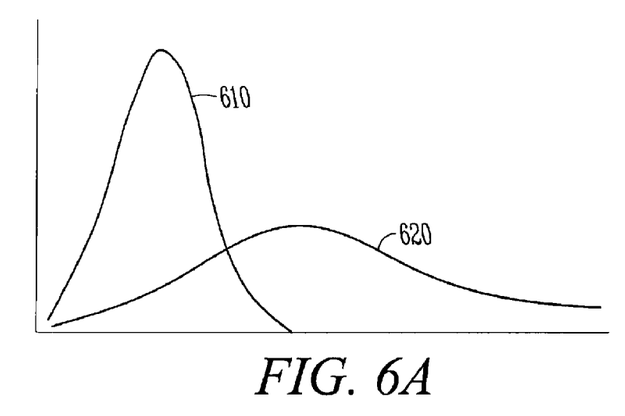
FIGS. 6A, 6B, and 6C are additional example graphs of probability density functions.
Figure 6B:
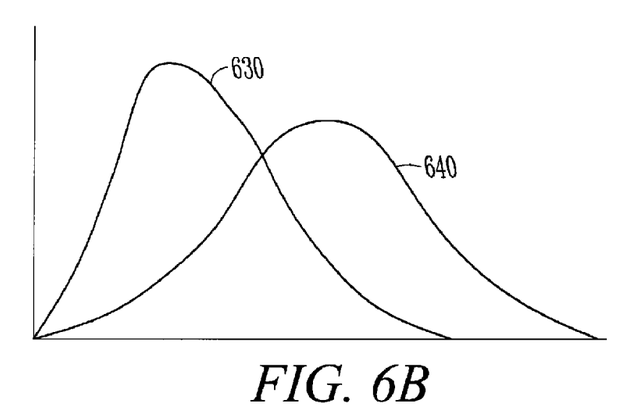

A sub-image/patches pool is generated, and useful sub-images are selected from the pool. After the generation of all of the probability density functions for all of the corresponding sub-image or patch sets, an information gain is determined for each corresponding sub-image set, to determine which corresponding sub-images provide the best information. In general, for detecting behaviors and patterns, the sub-images that incur the most change within them provide the most information. Such sub-images generate a probability density function as illustrated in FIG. 6A, in which the function 610 generated by training the system with the same behavior or pattern is quite distinct from the function 620 generated by training the system with a different behavior or pattern. In FIG. 6B, the plot correspond to a situation where the behavior or pattern present in the function 630 and the different behavior function 640 have become more similar. So the patch associated with the functions 630 and 640 has less saliency and provides less information than the patch associated with functions 610 and 620. The least salient patch is associated with FIG. 6C. That is, in FIG. 6C, the same behavior function 650 and the different behavior function 660 are almost identical, and it would be virtually impossible to use such functions to identify a behavior or a pattern in a test video sequence. For example, suppose there are two sequences of a person throwing a stone using his/her arm while walking and two sequences of person walking. There is a patch from the arm and a patch from the leg. The similar activity probability density function and the different activity probability density function are calculated for the two patches. It is known that the arm patch is the FIG. 6A case, where function 610 and function 620 differ much; the leg patch is the FIG. 6C case, where function 650 and function 660 are almost identical.

Specifically, the information gain for a sub-image j may be defined as follows:

$$\text{Information\_gain}_j = \frac{P(D_j = d_j | \text{same\_activity, pattern})}{P(D_j = d_j | \text{different\_activity, pattern})} \quad (5)$$

The distance $D_j$ is a distance (dissimilarity) measure, and belongs to [0,1]. The saliency or irregularities of corresponding sub-images is defined as proportional to the information gain of a sub-image as such:

$$\text{Saliency}_j \propto \text{Information\_gain}_j \quad (6)$$

A different behavior and/or pattern is differentiated by the saliency of the sub-images. For example, in an activity of a moving arm, the sub-images in the upper body have much more saliency that the sub-images on the legs of a person. Therefore, it can be ordered by the information gain as follows $$\text{Information\_gain}_1 \geq \text{Information\_gain}_2 \geq \ldots \geq \text{Information\_gain}_m \quad (7)$$

Figure 6C:
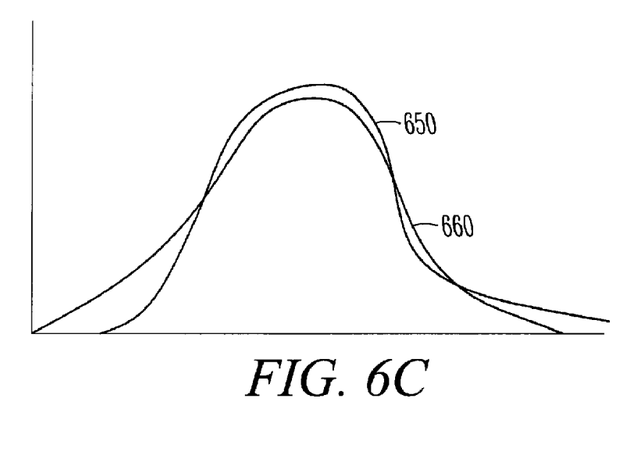

So $\text{patch}_1, \text{patch}_2, \ldots, \text{patch}_m$ are chosen. The $\text{patch}_{m+1}$ is not chosen because $\text{Information\_gain}_{m+1}$ doesn't bring much additional information. A simple method is to set a threshold, that is, if the $\text{Information\_gain}_{m+1} \approx 1$, where the threshold here is 1. In FIG. 6C, the patch related to Function 650 and Function 660 is the case. More complex method can be used, such as 'Early stopping' rule, that is to select m patches before such that $\text{Information\_gain}_{m+1}$ is above a predefined threshold.

The total gain may be defined as follows:

$$\text{Total\_gain} = \sum_{j=1}^{m} \log(\text{Information\_gain}_j) \quad (8)$$

With the training phase completed, the test phase can be implemented.

During the test phase 255, the process 200 continues by receiving a video sample into the system 100, and using the system 100 to determine if the behavior in the received video sample is the same as, or substantially similar to, a behavior that the system 100 was trained to recognize. The video samples received by the system may be referred to as testing video samples because the system is testing these samples to determine if a trained behavior is present in these samples. At 260, the system 100 receives testing video samples. The testing video samples are captured by the plurality of video sensing devices 110 in the system 100 (or a plurality of video sensing devices that are arranged substantially similar to the arrangement used in the training phase). The system 100 retrieves a stored video sequence from the system database 150, and the testing video sequences are compared to determine whether they belong to one of the stored behavior sequence. For each activity sequences, there are the selected sub-images or patches from the training phase, so they are applied to the sub-images/patches on the testing video sequences, features are extracted from the patches, and the total gain is calculated. During the training phase, for a specific activity/pattern, a specific set of patches is selected, so that during testing phase, 'apply patches' means using these selected patches on the testing sequence.

$$\text{Total\_gain} = \sum_{j=1}^{m} \log(\text{Information\_gain}_j)$$

When the information gain for the selected patch is calculated, the distance between the sub-image features of the testing video sample and the sub-image features of the stored video sample is calculated. In an embodiment, the stored video sequence is one of the many video sequences that were used to train the system 100. The information gain can be obtained by plugging in the distance in the conditional probability density function 510 and the conditional the probability density function 520. The greater the total gain (probability factor) generated by a function, the greater the probability that the behavior was in the testing video sample. For example, referring to FIG. 5, if a testing video sample generates a distance number of 0.25, then the probability associated with that number for function 510 (relating to a same activity) is approximately 0.3, and the probability associated with that distance for the function 520 is approximately 0.1. The information gain for this sub-image/patch is 0.3/0.1=3. After the calculation of the total gain, the testing video sample is compared with all the training video samples that were used to train the system. A certain percentage of the training video samples that produced the highest probabilities are identified. For example, the highest 5%. If this percentage of training video samples all relate to the same behavior, or the majority of these samples relate to the same behavior, then it can be stated with a certain degree of confidence that the testing video sample contains that behavior.

The system 100 may also be used to detect behaviors and patterns in a single video frame. The procedure is as disclosed above for a sequence of video frames. A difference is that the procedure is applied to a single video frame.

In the foregoing detailed description of embodiments, various features are grouped together in one or more embodiments for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The abstract is provided to comply with 37 C.F.R. 1.72(b) to allow a reader to quickly ascertain the nature and gist of the technical disclosure. The Abstract is submitted with the understanding that it will not be used to interpret or limit the scope or meaning of the claims.

The invention claimed is:

1. A video processing system comprising:
one or more computer processors configured to:
receive first training video samples from a plurality of video sensing devices, the first training video samples comprising substantially similar subject matter;
generate a first training probability density function using features extracted from the first training video samples;
receive second training video samples from the plurality of video sensing devices, the second training video samples comprising insubstantially similar subject matter; and
generate a second training probability density function using features extracted from the second training video samples;
wherein the features extracted from the first training video samples are extracted from a plurality of sub-images in the first training video samples, wherein the features extracted from the second training video samples are extracted from a plurality of sub-images in the second training video samples, wherein a location in a video frame of each sub-image in the second video training samples corresponds to a substantially similar location in a video frame for each corresponding sub-image in the first training video samples, and wherein the sub-images in the first training video samples and the sub-images in the second video training samples are non-contiguous within a field of view of the plurality of video sensing devices.

2. The video processing system of claim 1, further comprising:
one or more computer processors configured to:
receive testing video samples from the plurality of video sensing devices;
extract features from the testing video samples;
calculate a distance between features from the testing video samples and stored video samples; and
apply the distance to the first training probability density function and the second probability density functions to determine whether the testing video samples correlate to one or more of the first training video samples and the second video training samples.

3. The video processing system of claim 2, further comprising one or more computer processors configured to apply a threshold to the first training probability density function, wherein the threshold provides an indication of whether the testing video samples correlate with the first training video samples.

4. The video processing system of claim 1, wherein the video processing system is further comprises one or more computer processors configured to identify the one or more sub-images by identifying points of interest in the first and second training video samples.

5. The video processing system of claim 1, wherein the features comprise one or more of a temporal feature, a spatial feature, and a spatial-temporal feature.

6. The video processing system of claim 5, wherein the spatial feature comprises a distance between a point within the sub-image and a point within an object in the sub-image.

7. The video processing system of claim 5, wherein the spatial features include directional and derived features, and the temporal features include optical flow components.

8. The video processing system of claim 7, wherein the directional features comprise one or more of a vertical feature, a horizontal feature, a forward diagonal feature, a backward diagonal feature, a diagonal energy feature, and a mean energy feature.

9. The video processing system of claim 1, wherein the first training probability density function is generated by one or more computer processors configured for:
estimating a distance between features on the similar subject matter; and further wherein
the second training probability density function is generated by:
estimating the distance between features on the insubstantially similar subject matter.

10. The video processing system of claim 1, wherein the sub-images in the first training video samples and the sub-images in the second video training samples are positioned in the field of view of the plurality of video sensing devices as a function of an information gain provided by the sub-images in the first training video samples and the sub-images in the second video training samples.

11. The video processing system of claim 10, wherein the information gain of the sub-images images in the first training video samples and the sub-images in the second video training samples is a function of changes in video content of the sub-images in the first training video samples and the sub-images in the second video training samples.

12. A video processing system comprising:
one or more computer processors configured to:
receive first training video samples,
the first training video samples captured by a plurality of video sensing devices, each video sensing device representing a different view of a field of view,
each first training video sample comprising a first video sequence and a second video sequence, the first video sequence and the second video sequence comprising substantially similar subject matter captured by a single video sensing device of the plurality of video sensing devices;
identify a plurality of sub-images in each frame of the first video sequence and the second video sequence, each sub-image in the first video sequence having a corresponding sub-image in the second video sequence, and each sub-image in the first video sequence having a substantially similar location in a video frame as a location of a corresponding sub-image in a video frame of the second video sequence, wherein the sub-image in each frame of the first video sequence and the sub-images in each frame of the second video sequence are non-contiguous within a field of view of the plurality of video sensing devices;
extract features from each of the sub-images; and
generate a first training probability density function for each sub-image and corresponding sub-image as a function of the extracted features;
and wherein the video processing system further comprises one or more computer processors configured to:
receive second training video samples,
the second training video samples captured by the plurality of video sensing devices,
each second training video sample comprising a first video sequence and a second video sequence, the first video sequence and the second video sequence of the second training video sample comprising insubstantially similar subject matter captured by a single video sensing device of the plurality of video sensing devices;
identify a plurality of sub-images in each frame of the first and second video sequences of the second training video sample, each sub-image in the first video sequence of the second training video sample having a corresponding sub-image in the second video sequence of the second training video sample, wherein the plurality of sub-images are non-contiguous within a field of view of the plurality of video sensing devices;
extract features from each of the sub-images of the second training video sample; and
generate a second training probability density function for each sub-image and corresponding sub-image as a function of the extracted features of the second training video samples.

13. The video processing system of claim 12, further comprising:
one or more computer processors configured to:
receive testing video samples, the testing video samples captured by the plurality of video sensing devices;
identify a plurality of sub-images in each frame of the testing video samples, each sub-image in the testing video samples corresponding to a sub-image in one or more of the first training video samples and the second training video samples, and each sub-image comprising less than the entire frame of the testing video samples;
extract features from each of the sub-images of the testing video samples;
calculate a feature number for each of the sub-images of the testing video samples; and
apply the feature number to the first training probability density function and the second probability density function to determine whether the testing video samples correlate to the first training probability density function or the second training probability density function.

14. The video processing system of claim 12, wherein the video processing system is further comprises one or more computer processors configured to identify the plurality of sub-images in each of the first training video samples, the second training video samples, and the testing video samples by identifying points of interest in the frame of a video sequence.

15. The video processing system of claim 12, wherein the features comprise one or more of a spatial feature, a temporal feature, and a spatial-temporal feature.

16. The video processing system of claim 12, wherein the first training probability density function is generated by one or more computer processors configured for:

estimating a distance between features for each sub-image of the similar subject matter in the first training video sample;
and further wherein
the second training probability density function is generated by one or more computer processors configured for:
estimating the distance between features for each sub-image of the insubstantially similar subject in the second training video sample.

17. The video processing system of claim 12, wherein
each first training video sample comprises a single image frame;
each second training video sample comprises a single image frame; and
each testing video sample comprises a single image frame.

18. An image processing system comprising:
one or more computer processors configured to:
receive first training images from a plurality of video sensing devices, the first training images comprising substantially similar subject matter;
identify a plurality of sub-images in each first training image, wherein the sub-images in each first training image are non-contiguous within a field of view of the plurality of video sensing devices;
generate a first training probability density function using features extracted from the first training images;
receive second training images from the plurality of video sensing devices, the second training images comprising insubstantially similar subject matter;
identify a plurality of sub-images in each second training image, each sub-image in the second training image having a corresponding sub-image in the first training images and each sub-image in the first training images having a substantially similar location in a video frame as a location of each corresponding sub-image in a video frame of the second training images, wherein the sub-images in each second training image are non-contiguous within a field of view of the plurality of video sensing devices; and
generate a second training probability density function using features extracted from the second training images;
wherein the first probability density function is generated by one or more computer processors configured for:
estimating the distance between features for each sub-image of the similar subject matter;
wherein the second probability density function is generated by one or more computer processors configured for:
estimating with the computer processor the distance between features for each sub-image of the insubstantially similar subject matter.

19. The image processing system of claim 18, further comprising:
one or more computer processors configured to:
receive testing images from the plurality of video sensing devices;
identify a plurality of sub-images in each testing image, the plurality of sub-images in each testing image corresponding to a sub-image in one or more of a first training image and the second training image, wherein each sub-image in each testing image comprises less than an entire frame of the testing image;
extract features from each of the sub-images in the testing images;
combine the features from each of the sub-images of the testing images to form a feature number; and apply the distance between features to the first training probability density function and the second training probability density function to determine whether the testing images correlate to the first training probability density function or the second training probability density function.

20. The image processing system of claim 19, wherein the image processing system is further comprises one or more computer processors configured to identify with the computer processor the plurality of sub-images in each of the first training images, the second training images, and the testing images by identifying points of interest in the frame of a video sequence.

* * * * *